Figure 1:
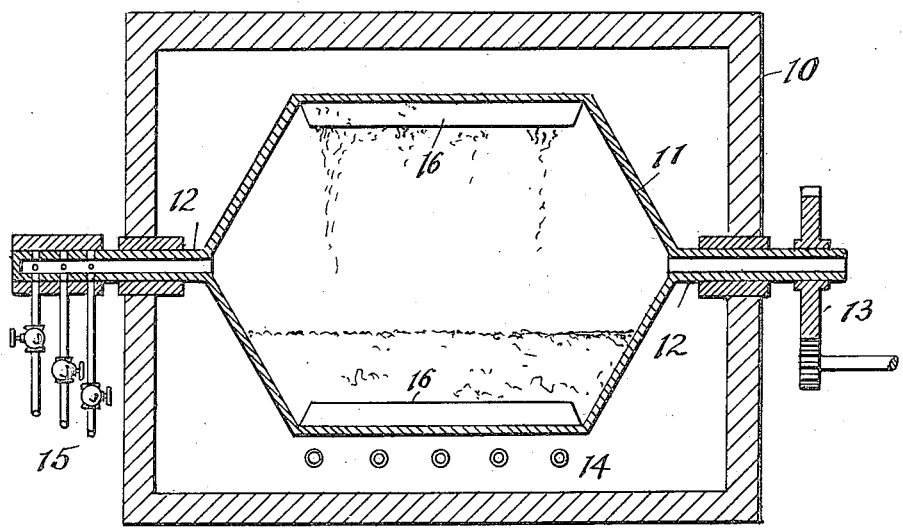

Apr. 24, 1923.

J. A. WILLIAMS 1,453,057

PROCESS OF MAKING IRON, STEEL, OR STEEL ALLOYS

Filed Dec. 6, 1920

Inventor
Joseph A. Williams
by
Thurston, Kwis & Hudson
attys

Patented Apr. 24, 1923.

1,453,057

UNITED STATES PATENT OFFICE.

JOSEPH A. WILLIAMS, OF CLEVELAND, OHIO.

PROCESS OF MAKING IRON, STEEL, OR STEEL ALLOYS.

Application filed December 6, 1920. Serial No. 428,583.

*To all whom it may concern:*

Be it known that I, JOSEPH A. WILLIAMS, a citizen of the United States, residing at Cleveland, in the county of Cuyahoga and State of Ohio, have invented a certain new and useful Improvement in Process of Making Iron, Steel, or Steel Alloys, of which the following is a full, clear, and exact description.

This invention relates to a process of making iron, steel, or steel alloys without subjecting any of the materials employed to a melting or smelting process.

The principal object of the invention is to provide a process which results in a very high grade product such, for example, as is desired for the production of certain accurately formed parts heretofore made by casting and subsequent machining, and such as is desired for the production of tools, dies, cutlery, etc.

More particularly the invention aims to provide a process by which a product is obtained which is entirely or substantially entirely free of impurities, and in so far as the production of steel or steel alloys is concerned, to produce a product having a known or absolutely definite carbon content, or a definite content of the alloying metal or metals; also a product which is homogeneous chemically and physically, and one free of so-called segregations, blowholes and the like.

The invention may be briefly summarized as consisting in certain novel steps of the improved method which will be described in the specification and set forth in the appended claims.

Though the invention is not confined to any particular form or construction of apparatus, in the drawing I have shown conventionally in vertical section, an apparatus which may be used to advantage in carrying out the principal steps of the process.

In carrying out my improved process I prefer to start with iron or steel scrap, such as borings, punchings, cuttings, clippings and the like, with the parts preferably in fairly small form, and cleaned, if necessary, to remove foreign substances. In the event the scrap is of fairly large size, it can be chopped into pieces of suitable small size.

I prefer to start with scrap iron or steel, as just stated, for the reason that I find that I can in this manner obtain material which for all practical purposes is free of impurities. At any rate, this material is exceedingly more free of impurities than the best available grade of ore such as iron oxide.

Figure 2:
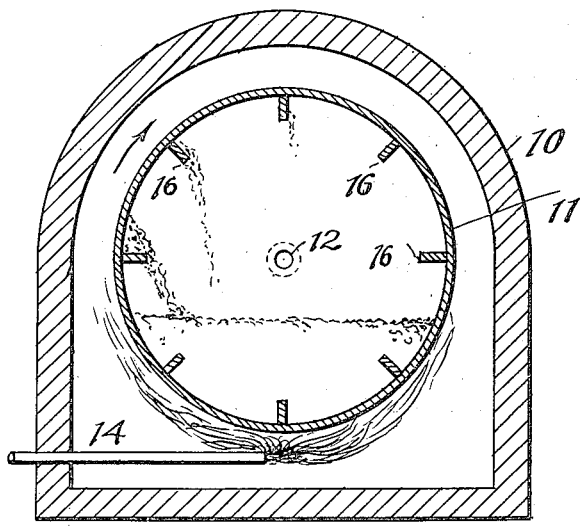

As the first chief step of my improved process, assuming that clean scrap material of the right size is obtained, I convert the material to an oxide of iron in a powderous form. This is preferably done in apparatus such as shown in the drawings, namely, in a heated tumbling container through which a suitable oxidizing medium is passed. This same apparatus can be used to advantage also in carrying out the subsequent steps of the process. I will therefore briefly refer to the drawing, in which Figs. 1 and 2 are longitudinal and transverse vertical sections, respectively, showing apparatus which may be used in carrying out the process.

The apparatus shown in the drawing includes an outer heating chamber 10 carrying an inner revoluble container 11, rotatably supported through the medium of hollow shafts or trunnions 12 in opposite walls of the chamber 10. The inner chamber 11 may be rotated by any suitable means, such as indicated at 13. The outer chamber is preferably provided with suitable orifices or pipes 14 for the supply of heating gases or flames which can be directed as desired, or the chamber 10 can be otherwise heated. The chamber 11 is preferably formed of a suitable non-oxidizing material such as nickel.

It is in the inner chamber 11 that the steps of the process are carried out, i. e. the oxidizing step, the subsequent reducing step, and the carbonizing step if steel is produced, the gases for accomplishing these results being preferably admitted and withdrawn from the chamber 11 through the trunnions. In this instance gas supply pipes 15 are shown for supplying the gases for these purposes.

The material which is first to be oxidized, is supplied to the chamber 11, which will be provided with a suitable man-hole for this purpose, and when the chamber is heated to the right temperature, which may be varied, but preferably about 1400° to 1600° Fahrenheit, the oxidizing gas or medium is passed through the chamber while it is undergoing a continuous rotation. For the oxidizing medium I prefer to use steam, though any other suitable gas may be employed. While the material is subjected to the oxidizing medium in the rotating container 11, it is thoroughly agitated for the double purpose of permitting the proper and uniform access of the oxidizing medium to the material, but chiefly for the purpose of knocking off or freeing from the particles or pieces being oxidized, the oxide as fast as it is formed, so that there will be constantly presented to the oxidizing medium fresh metal to be oxidized. For this purpose the container is preferably provided on the interior with inwardly extending flanges or ribs indicated at 16 so as to carry the material being treated part way around, and permit it to drop to the bottom of the container through the body of steam or other oxidizing medium employed. If the oxidizing of the metal and the breaking off or clearing of the oxide from the metal should not be carried out rapidly enough by the mere act of tumbling the pieces being treated, I contemplate inserting in the chamber non-oxidizable balls or equivalent material which is tumbled or rolled around with the material being oxidized so as to accelerate this action.

If steam is used as the oxidizing agent, hydrogen is given off and can be conveyed to a suitable gasometer for use in a subsequent step of the process.

This oxidizing step will be carried on until the material being treated is converted to a fine powderous oxide. The time to discontinue the oxidizing step can be determined either by testing the material being oxidized, or by testing the gas which leaves the container. If the last mentioned test shows absence of hydrogen, the oxidation is complete.

Then after the oxide is obtained in the form of a fine powder as above explained, as a second step the oxide is converted to a fine and practically pure metallic iron preferably by reducing the oxide while still in the container 11. Any suitable reducing gas may be employed, such as hydrogen, water gas or carbon monoxide, and in the event that steam was utilized for the oxidizing step, the hydrogen given off and collected in the gasometer will be passed through the chamber to convert the oxide, or to assist in converting the oxide to the metallic iron.

After the reducing step is completed, the fine and practically pure metallic iron is allowed to cool, preferably in the presence of the reducing gas, so as to prevent entirely any oxidation while the temperature is being reduced to the working temperature for the subsequent steps of the process.

From this point the process will be varied, depending upon whether the ultimate product is iron or steel, and it might be mentioned at this point that if an alloy is to be produced, the above process will be varied somewhat, as will be explained subsequently. Assuming, however, that an iron product is to be obtained, the fine metallic iron is with a suitable press and suitably shaped mold, compressed under very high pressure into a solid body. In this step of the process I can produce finished smooth surfaced articles or products of the desired size and shape with a greater degree of accuracy than is generally possible when the articles are cast and then machined. However, after the compressing step, the articles are preferably heated or sintered, and it is characteristic of the sintering that the article undergoes no shrinkage, at least it undergoes no shrinkage of any consequence, this being due to the fact that pure, finely divided iron, free of oxides, silicon and the like is compressed in the mold.

In the event that the iron is not to be compressed into smooth surfaced finished articles of given size, the iron can be molded into bricks or ingots which can be heated and forged, and subsequently worked into any desired shape.

If steel is to be formed, the process is the same as that above described, as far as the oxidizing and reducing steps are concerned, and after the finely divided metallic iron is obtained, a carbonizing gas such as carbon monoxide is supplied to, or passed through the chamber 11 while the finely divided iron is being agitated by the rotation of the chamber at the desired temperature such as 1400° to 1600° Fahrenheit, or higher if desired, and this is continued until the iron is carbonized to the right degree, producing finely divided steel. With this process the exact amount of carbonizing is obtained, or a definite carbon content can be gotten into the steel either by supplying a predetermined amount of the carbonizing gas necessary to impart the desired carbon content, or this can be determined by extracting samples from time to time, which can be tested, and the carbonizing step continued until the tests show that steel is obtained having the desired carbon content. Thereupon the supply of carbonizing gas is discontinued, and the finely divided steel is allowed to cool, the cooling taking place under conditions which prevent oxidation.

From this point the process can be completed as in the production of iron, namely, the finely divided or powdered steel is compacted or compressed under very severe pressure either to the shape and size that the final article is to assume, or it can be compressed into a bar or block to be subsequently worked, the same as with an ordinary cast ingot, in which event it is heated to a welding heat, and then preferably forged in a suitable press or hammer into a perfectly solid, physically homogeneous body and then can be otherwise worked as desired.

In the event an alloy is to be produced, the alloying metal or metals can be supplied to the chamber 11 at the beginning of the process, or at some other desired point of the process, and I may supply the metal or metals themselves, or compounds of the metals, such as oxides, the right amount being added in each instance to obtain the desired content of the alloying metal or metals. The alloying metal or metals, whether in a pure metallic state, or in the form of compounds, such as oxides, are preferably added to the chamber 11 with the iron or steel scrap, the process being otherwise the same as that utilized for the production of steel.

Whether the alloying metal or metals are supplied in a metallic state or in the form of oxides, in the reducing step the oxide or oxides will be reduced along with the iron oxide to the metallic state, and after the carbonizing step there is practically a perfect and uniform mixture of finely divided steel and the metal or metals to be alloyed therewith. However, with alloying metals which can not be reduced as readily as oxide of iron, the finely divided metal or metals will be added after the reducing step, to the finely divided metallic iron, and thoroughly mixed therewith, after which the carbonizing step is carried out as in the production of steel, or the mixing can be conducted after the carbonizing step.

The process is then continued precisely as explained in connection with the production of steel. That is to say, the thoroughly mixed metals are compressed in a press under suitable severe pressure to form a dense bar or ingot which is subsequently heated to welding temperature and then forged to produce the alloying and for the purpose of working the bar or ingot into the desired shape, or the mixed metals can be molded into the desired shape of the finished article in a press capable of subjecting the materials to a sufficiently high pressure and then the alloying can be accomplished by heating the molded articles and allowing them to cool either gradually or suddenly, as by quenching them if they are to be tempered. In thus alloying the compressed articles the molded article whether or not in the form of a bar, is heated to a point which does not exceed the melting temperature of the least refractory metal.

It will be seen therefore, that by the above process I am enabled to produce iron, steel, or steel alloy, whether or not in the shape of the final article to be produced, with the steel having the precise or exact carbon content desired, and with the alloy having the desired metal content, and this is accomplished without any melting of smelting process. Furthermore, the article is homogeneous chemically and physically, especially when it is forged into an absolutely non-porous body, and as the product is absolutely free from such imperfections as blow-holes, common in casting, as there is a complete absence of so-called segregations, a high grade product is obtained.

I might say in conclusion, that any of the usual steel alloys can be produced, the process being very well adapted for the production of alloys from iron and any of the metals which alloy therewith, such as tungsten, nickel, cobalt, molybdenum, etc.

Above I have described the preferred way of carrying out the process for the production of iron, steel, or steel alloys, including the several steps which can be carried out in sequence when starting with iron and steel scrap, but I wish it to be understood that I am not to be limited to the combination of steps herein recited, as one or more of them may be used advantageously without others.

Having described my invention, I claim:

1. The process which comprises oxidizing iron or steel scrap so as to produce iron oxide in finely divided form, reducing the oxide to powdered metallic iron, and subsequently treating the metallic iron so as to produce a solid metallic body.

2. The step in the process of producing iron or steel without melting or smelting, which comprises agitating iron or steel scrap in a heated container in the presence of an oxidizing medium so as to produce oxide of iron in finely divided form.

3. The steps in the process of producing iron or steel bodies which comprise agitating iron or steel scrap in a heated container in the presence of an oxidizing medium so as to produce iron oxide in finely divided form, and subsequently subjecting the oxide to the action of a reducing gas so as to produce finely divided metallic iron.

4. The steps in the process of producing iron or steel bodies which comprise agitating iron or steel scrap in a heated container in the presence of an oxidizing medium so as to produce iron oxide in finely divided form, subjecting the oxide to the action of a reducing gas so as to produce finely divided metallic iron, and subsequently compressing the finely divided material into a solid body.

5. The step in the process of making steel which comprises subjecting metallic iron in finely divided form to the action of a carbonizing gas.

6. The step in the process of making steel which comprises agitating finely divided metallic iron in a heated container in the presence of a carbonizing gas.

7. The process of making steel which comprises converting iron or steel scrap to oxide of iron, treating this so as to produce finely divided metallic iron, and carbonizing the finely divided iron by subjecting it at a suitable temperature to a carbonizing gas producing finely divided steel of the desired carbon content.

8. The process of making steel which comprises converting iron or steel scrap to oxide of iron, treating this so as to produce finely divided metallic iron, carbonizing the finely divided iron, and compressing the product into a solid body.

9. The process of making iron or steel products without melting or smelting, which comprises agitating iron or steel scrap in a heated container in the presence of steam so as to produce finely divided iron oxide, and subsequently passing the hydrogen given off during the oxidizing step through the container so as to reduce the oxide to finely divided metallic iron.

10. The process of making steel which comprises treating iron or steel scrap so as to produce oxide of iron, reducing the oxide of iron to metallic iron in finely divided state, subjecting the metallic iron to the action of a carbonizing gas until carbonized the desired amount, and forming by compression a solid body from the product thus obtained.

11. The process of making alloys which comprises treating iron or steel scrap with an oxidizing medium so as to produce iron oxide, reducing the oxide to metallic iron in powdered form, carbonizing the metallic iron, adding the desired amount of the alloying metal or metals or compounds thereof at a suitable point in the process so as to obtain a uniform mixture of finely divided steel and of the metal or metals to be alloyed therewith, and subsequently subjecting the mixture to severe pressure so as to produce a solid body.

12. The process of making alloys which comprises treating iron or steel scrap with an oxidizing medium so as to produce iron oxide, reducing the oxide to metallic iron in powdered form, carbonizing the metallic iron, adding the desired amount of the alloying metal or metals or compounds thereof at a suitable point in the process so as to obtain a uniform mixture of finely divided steel and of the metal or metals to be alloyed therewith, subsequently subjecting the mixture to severe pressure so as to produce a solid body, and heating it to a point below the melting temperature of the least refractory metal.

13. The process which comprises converting iron or steel scrap into finely divided iron oxide, treating the oxide so as to convert it to powdered metallic iron, subsequently treating the metallic iron so as to produce a solid metallic body, and heating it.

14. The process which comprises oxidizing iron or steel scrap, treating the same so as to produce finely divided iron oxide, subjecting the oxide to the action of a reducing medium under heat conditions which will convert the oxide to finely divided metallic iron, and producing a solid body by compression and subsequent heating.

In testimony whereof, I hereunto affix my signature.

JOSEPH A. WILLIAMS.